United States Patent Office 3,828,045
Patented Aug. 6, 1974

3,828,045
DIGLYCIDYL ETHERS OF FIVE AND SIX MEMBERED N-HETEROCYCLIC COMPOUNDS
Hans Batzer, Arlesheim, Juergen Habermeier, Allschwil, and Daniel Porret, Binningen, Switzerland, assignors to Ciba-Geigy AG, Basel, Switzerland
No Drawing. Filed Jan. 26, 1971, Ser. No. 109,953
Claims priority, application Switzerland, Jan. 30, 1970, 1,347/70
The portion of the term of the patent subsequent to Dec. 21, 1988, has been disclaimed
Int. Cl. C07d 51/30, 49/32
U.S. Cl. 260—260                    5 Claims

ABSTRACT OF THE DISCLOSURE

New diglycidyl ethers of mononuclear, five-membered or six-membered, unsubstituted or substituted N-heterocyclic compounds with two NH groups in the molecule, containing butene oxide as an adduct, produced by reaction of mononuclear, five-membered or six-membered, unsubstituted or substituted N-heterocyclic compounds, for example hydantoin, barbituric acid, uracil, dihydrouracil, parabanic acid and the corresponding derivatives, with butene oxide, for example 1,2-butene oxide, to give monoalcohols or dialcohols, and subsequent glycidylation of the OH groups or of the OH group and the NH group to give the corresponding glycidyl ethers.

---

In Netherlands Patent No. 691903 issued on May 13, 1970 which corresponds to Swiss Patent No. 523,278 issued on May 31, 1972 are claimed new diglycidyl compounds of the general formula:

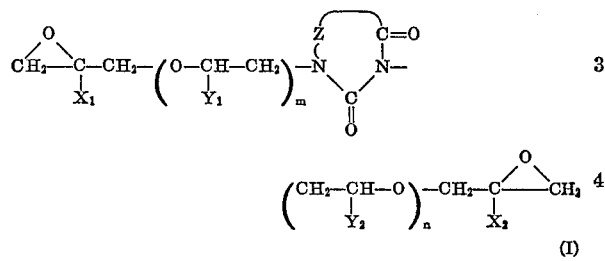

(I)

wherein $X_1$, $X_2$, $Y_1$ and $Y_2$ each denotes a hydrogen atom or a methyl group and Z denotes a nitrogen-free divalent radical which is required to complete a five-membered or six-membered, unsubstituted or substituted, heterocyclic ring, and $m$ and $n$ each represents an integer having a value of 0 to 30, preferably of 0 to 4, with the sum of $m$ and $n$ having to be at least 1.

The compounds of the formula (I) are manufactured by reacting compounds of the general formula

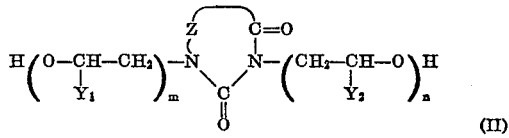

(II)

wherein $Y_1$, $Y_2$, Z, $m$ and $n$ have the same meaning as in formula (I), in one stage or several stages, with an epihalogenohydrin or β-methylepihalogenohydrin, such, for example, as epichlorohydrin, β-methylepichlorohydrin and epibromohydrin, in a manner which is in itself known.

The monoalcohols or dialcohols of the general formula (II) are obtained in a known manner by reacting mononuclear N-heterocyclic compounds of the general formula

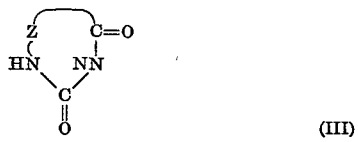

(III)

wherein Z has the same meaning as in formula (I), with ethene oxide (ethylene oxide) or propene oxide (propylene oxide) in the presence of a suitable catalyst.

It has now been found that reaction of mononuclear N-heterocyclic compounds of the formula (III) with a butene oxide, preferably 1,2-butene oxide, 1,2-cyclopentene oxide or 1,2-cyclohexene oxide, in the presence of a suitable catalyst, yields new monoalcohols or dialcohols, which can be reacted in a known manner, in a single stage or several stages, with an epihalogenohydrin or β-methylepihalogenohydrin, such as for example epichlorohydrin, β-methylepichlorohydrin or epibromohydrin, to give glycidyl compounds.

In comparison to the glycidyl compounds described in the Dutch patent, the new glycidyl compounds are distinguished by considerably lower viscosity, so that apart from the customary casting resin applications they can also, for example, be used as laminating resins.

The present invention provides new diglycidyl ethers of the general formula

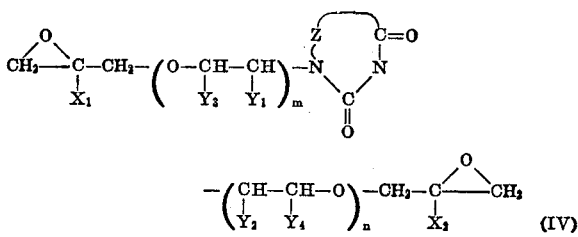

(IV)

wherein $X_1$, $X_2$, $Y_1$ and $Y_2$ each denote a hydrogen atom or a methyl group and $Y_3$ and $Y_4$ each denotes a methyl or ethyl group, the sum of the carbon atoms in the two radicals $Y_1$ and $Y_3$ or $Y_2$ and $Y_4$ having always to be 2, or wherein $Y_2$ and $Y_4$ together denote the trimethylene or tetramethylene radical, and Z denotes a nitrogen-free, divalent radical which is required to complete a five-membered or six-membered, unsubstituted or substituted, heterocyclic ring, and $m$ and $n$ each represent an integer having a value of 0 to 30, preferably of 0 to 4, the sum of $m$ and $n$ having to be at least 1.

New diglycidyl ethers of the formula (I) are manufactured by reacting compounds of the general formula

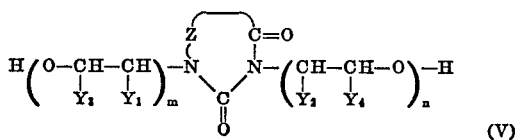

(V)

wherein $Y_1$, $Y_2$, $Y_3$, $Y_4$, Z, $m$ and $n$ have the same meaning as in formula (IV), in one stage or several stages, with an epihalogenohydrin or β-methylepihalogenohydrin, such, for example, as epichlorohydrin, β-methylepichlorohydrin or epibromohydrin, in a manner which is in itself known.

In the single-stage process, the reaction of the epihalogenohydrin with a compound of the formula (V) takes place in the presence of alkali, with sodium hydroxide or potassium hydroxide preferably being used. In the two-stage process, which is used for preference, the compound of the formula (V) is condensed in a first stage with an epihalogenohydrin, in the presence of acid or basic catalysts, for example preferably tetraethylammonium chloride, to give the halogenohydrin compound. Thereafter the latter is dehydrohalogenated in a second stage, by means of alkalis such as potassium hydroxide or sodium hydroxide, to give the glycidyl ether.

The addition of the butene oxide to one or both NH groups, or the addition of the cyclopentene oxide or cyclohexene oxide to a NH group of the N-heterocyclic compounds of the formula (III) can be carried out either in the presence of acid catalysts or of alkaline catalysts with a small excess of equivalent epoxide groups of the butene oxide being employed per equivalent NH group of the N-heterocyclic compound of the formula (III).

Preferably, however, alkaline catalysts, for example tetraethylammonium chloride or tertiary amines, are used in the manufacture of monoalcohols and dialcohols of the formula (V), in which the sum of $m$ and $n$ is 1 or 2. However, alkali halides, for example lithium chloride or sodium chloride, can also be successfully used for this addition reaction; it also takes place without catalysts.

In the manufacture of dialcohols of the formula (V), in which the sum of $m$ and $n$ is greater than 2, it is preferable to start from the simple dialcohols of the formula (V), in which $m$ and $n$ are each 1, and further butene oxide is added to the two OH groups of this compound in the presence of acid catalysts.

The mononuclear N-heterocyclic compounds of the formula (III) used for the manufacture of the new butene oxide addition products of the formula (V) are above all hydantoin, hydantoin derivatives, barbituric acid, barbituric acid derivatives, uracil, uracil derivatives, dihydrouracil and dihydrouracil derivatives, and also parabanic acid.

Hydantoin and its preferred derivatives correspond to the general formula

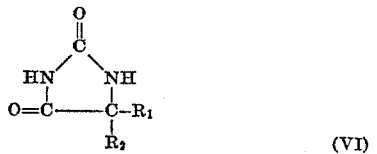

(VI)

wherein $R_1$ and $R_2$ each denote a hydrogen atom or a lower alkyl radical with 1 to 4 carbon atoms, or wherein $R_1$ and $R_2$ together form a tetramethylene or pentamethylene radical. Hydantoin, 5-methylhydantoin, 5-methyl-5-ethylhydantoin, 5-n-propylhydantoin, 5-isopropylhydantoin, 1,3 - diaza-spiro (4.5)-decane-2,4-dione, 1,3-diaza-spiro(4.4)-nonane-2,4-dione and preferably 5,5-dimethylhydantoin may be mentioned.

Barbituric acid and its preferred derivatives correspond to the general formula

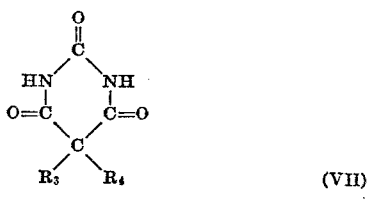

(VII)

wherein $R_3$ and $R_4$ independently of one another each denote a hydrogen atom, an alkyl radical, an alkenyl radical, a cycloalkyl or cycloalkenyl radical or a substituted or unsubstituted phenyl radical.

The following may be mentioned:

barbituric acid,
5-ethylbarbituric acid,
5,5-diethylbarbituric acid,
5-ethyl-5-butylbarbituric acid,
5-ethyl-5-sec-butylbarbituric acid,
5-ethyl-5-isopentylbarbituric acid,
5,5-diallylbarbituric acid,
5-allyl-5-isopropylbarbituric acid,
5-allyl-5-sec-butylbarbituric acid,
5-ethyl-5(1'-methylbutyl)barbituric acid,
5-allyl-5(1'-methylbutyl)barbituric acid,
5-ethyl-5-phenylbarbituric acid and
5-ethyl-5-(1'-cyclohexen-1-yl)-barbituric acid.

Uracil and its preferred derivatives correspond to the general formula

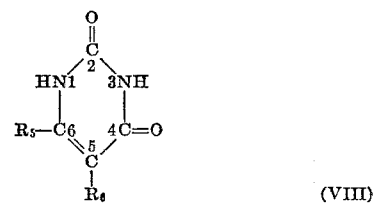

(VIII)

wherein $R_5$ and $R_6$ both denote hydrogen or one of the two radicals denote a hydrogen atom and the other radical denotes a methyl group.

Uracils of the formula (VIII) are uracil itself, and also 6-methyl-uracil and thymin (=5-methyl-uracil).

Dihydrouracil (= 2,4-dioxo-hexahydropyrimidine) and its preferred derivatives correspond to the general formula

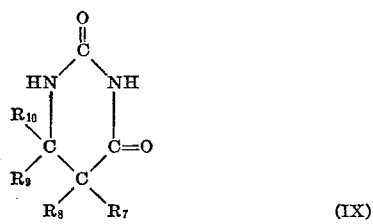

(IX)

wherein $R_7$ and $R_8$ both denote a hydrogen atom or alkyl radicals, which may be the same or different, preferably alkyl radicals with 1 to 4 carbon atoms, and $R_9$ and $R_{10}$ independently of each another each denotes a hydrogen atom or an alkyl radical.

In the above formula, the two radicals $R_7$ and $R_8$ preferably denote methyl groups, $R_9$ denotes a hydrogen atom or a lower alkyl radical with 1 to 4 carbon atoms, and $R_{10}$ denotes a hydrogen atom, The following may be mentioned: 5,6-dihydrouracil, 5,5-dimethyl-5,6-dihydrouracil (2,4-dioxo-5,5-dimethylhexahydropyrimidine) and 5,5-dimethyl - 6 - isopropyl-5,6-dihydrouracil (2,4-dioxo-5,5-dimethyl-6-isopropylhexahydropyrimidine).

The diglycidyl compounds according to the invention of the formula (IV) react with the usual curing agents for polyepoxide compounds and can therefore be crosslinked or cured by addition of such curing agents, analogously to other polyfunctional epoxide compounds or epoxide resin respectively. Possible curing agents of this nature are especially polycarboxylic acid anhydrides, such, for example, as hexahydrophthalic anhydride or phthalic anhydride, and also polyamines, such, for example, as triethylenetetramine or 3,5,5-trimethyl-3(aminomethyl)-cyclohexylamine.

The curable epoxide resin mixtures are above all employed in the fields of surface protection, electrical engineering, laminating processes, and the building industry.

In the Examples that follow, unless otherwise stated, parts denote parts by weight and percentages denote percentages by weight. The relationship of parts by volume to parts by weight is as of the millilitre to the gram.

To determine the mechanical and electrical properties of the curable mixtures described in the Examples that follow, sheets of size 92 x 41 x 12 mm. were manufactured for determining the flexural strength, deflection, flexural impact strength and water absorption. The test specimens (60 x 10 x 4 mm.) for determining the water absorption and for the flexural test and flexural impact test (VSM 77,103 or VSM 77,105) were machined from the sheets.

Test specimens of dimensions 120 x 15 x 10 mm. were in each case cast for determining the heat distortion point according to Martens (DIN 53,458).

Sheets of dimensions 120 x 120 x 4 mm. were cast for determining the arcing resistance.

Manufacture of the Starting Substances

Example A

3 - (2'-Hydroxy-n-butyl)-5,5-dimethylhydantoin: 256.3 g. of 5,5-dimethylhydantoin (2 mols) and 2.54 g. of lithium chloride in 300 ml. of dimethylformamide are together stirred at 65° C. 158.8 g. of 1,2-butene oxide (2.2 mols) are slowly added dropwise over the course of 2 hours at this temperature. Thereafter the mixture is stirred for a further 4 hours at 100° C. The solution is cooled to room temperature and filtered, and the filtrate is then concentrated on a rotary evaporator at 70° C./20 mm. Hg and dried to constant weight at 90° C./0.1 mm. Hg. A crystalline, light yellow crude product is obtained in quantitative yield (400.1 g.). The substance can be purified by recrystallisation from acetone. Colourless, glistening crystals melting at 87–88.5° C. are obtained.

Elementary analysis shows.—Calculated: 53.98% C, 8.06%; H, 13.99% N. Found: 53.7% C, 8.3% C, 13.94% N.

The mass spectrum shows a molecular weight of 200 (theory 200.22). The following characteristic fragments are found, inter alia (in mass numbers): 183,171, 142, 114, 113 and 99.

The substance thus corresponds to the following structure:

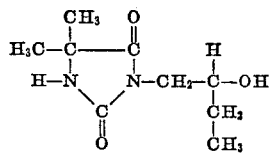

Example B 1,3-Di-(2'-hydroxy-n-butyl)-5,5-dimethylhydantoin: 256.3 g. of 5,5-dimethylhydantoin (2 mols), 4.25 g. of lithium chloride and 300 ml. of dimethylformamide are stirred at 65° C. 396.2 g. of 1,2-butene oxide (5.5 mols) are added dropwise thereto over the course of 2 hours. The temperature of the batch is raised from 65 to 95° C. over the course of 2 hours and the mixture is stirred for a further 3 hours at this temperature. Thereafter it is cooled to room temperature and filtered. The filtrate is concentrated at 70° C. on a rotary evaporator under 15 mm. Hg and is dried to constant weight at 90° C. and 10.1 mm. Hg. 534 g. of a clear, light brown liquid adduct (98% of theory) are obtained. Both the IR spectrum and the H–NMR spectrum show, through the absence of the signals for N–H and the presence of —OH frequencies, that the desired substance has been produced.

Elementary analysis shows.—Calculated: 10.29% N, 8.88% H. Found: 10.49% N, 8.85% H.

The new compound thus has the following structure:

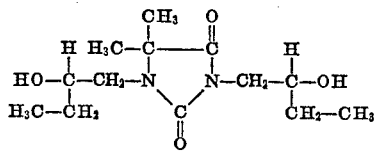

Example C 3-(2' - Hydroxycyclohexyl)-5,5-dimethylhydantoin: A mixture of 128.1 g. of 5,5-dimethylhydantoin (1 mol), 1 g. of lithium chloride and 200 ml. of dimethylformamide is stirred at 100° C. in a 500 ml. glass apparatus having a stirrer, thermometer, dropping funnel ad reflux condenser. 100 g. of cyclohexene oxide (1.02 mols) are added dropwise to this solution over the course of 120 minutes, whilst stirring. Thereafter the mixture is stirred for a further five hours at 125–130° C. After cooling to about 60° C., the reaction mixture is filtered and is concentrated to dryness on a rotary evaporator at 70° C. under a water-pump vacuum. Thereafter the residue is dried to constant weight at 90° C./0.1 mm. Hg. 217.8 g. of a yellowish, crystalline material (96.4% of theory) are obtained, and this can be recrystallised, for example from acetone. The purified product melts at 159–161° C.

Elementary analysis shows the following values.— Found: 58.6% C, 12.4% N. Calculated: 58.4% C, 12.4% N.

The proton-magnetic resonance spectrum (60 Mc–HNMR, in CDCl$_3$, using tetramethylsilane as an internal standard) shows, inter alia, through the presence of the signals of N$_1$H ($\delta$=7.4), the OH signals and the CH$_2$ signals and the hydantoin-CH$_3$ signals, that the desired monoadduct has been produced:

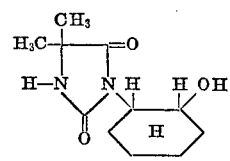

Example D 368.4 g. of 5,5-dimethyl-6-isopropyl-5,6-dihydrouracil (=2,4-dioxo-5,5-dimethyl - 6 - isopropylhexahydropyrimidene) (2 mols) in 2000 ml. of dimethylformamide are stirred with 12 g. of lithium chloride at 60–65° C. in accordance with Example B). 432.6 g. of 1,2-butene oxide (6.0 mols) are added dropwise thereto over the course of 120 minutes, with slight stirring. The temperature is raised to 95° C. over the course of one hour and the mixture is stirred for a further 12 hours at this temperature. Working-up is carried out precisely according to Example B.

A light yellow, clear, highly viscous substance is obtained in 88% yield (578 g.).

The proton-magnetic resonance spectrum (60 Mc H–NMR, recorded in CDCl$_3$ at 35° C., using tetramethylsilane as an internal standard) shows, through the presence of the following signals, that the product has the structure given below:

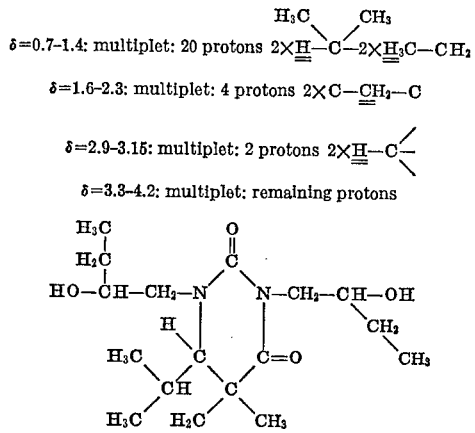

I. MANUFACTURING EXAMPLES

Example 1

1-Glycidyl-3-(2'-glycidyloxy-n-butyl) - 5,5 - dimethylhydantoin: A mixture of 501.5 g. of the 3-(2-hydroxy-n-buttyl)-5,5 - dimethylhydantoin crude product manufactured according to Example A (2.5 mols), 3240 g. of epichlorohydrin (35 mols) and 8.3 g. of tetraethylammonium chloride is stirred for 2 hours at 90° C. A circulatory distillation is then started at 60° C. and 60–90 mm. Hg, with intensive stirring, and 513 g. of 50% aqueous sodium hydroxide solution (6.4 mols) are slowly added dropwise over the course of 2 hours. In the course thereof, the water present in the reaction mixture is continuously azeotropically removed from the circuit and separated off. After the addition of the caustic alkali, the mixture is distilled for a further 15 minutes to remove the last remnants of water. 340 ml. of water are separated off (98.1% of theory). The sodium chloride formed is filtered off and rinsed with 100 ml. of epichlorohydrin, and the combined epichlorohydrin solutions are extracted by shaking with 200 ml. of water, to remove traces of caustic alkali and sodium chloride. The organic phase is separated off and completely concentrated at 60° C. on a rotary evaporator, under a slight vacuum; it is then dried to constant weight at 60° C. under 0.1 mm. Hg.

A light ochre-coloured, mobile epoxide resin is obtained in quantitative yield (782 g.). The epoxide content is 6.40 equivalents/kg. (100% of theory). The viscosity is 610 cP at 25° C. The proton-magnetic resonance spectrum shows that essentially the diglycidyl compound of the following structure has been produced:

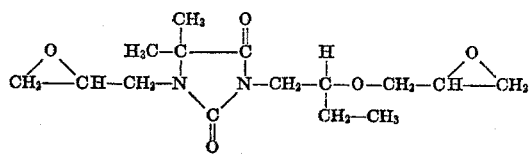

Example 2

1,3-Di-(2'-glycidyloxy-n-butyl) - 5,5 - dimethylhydantoin: A mixture of 533 g. of the 1,3-di-(2'-hydroxy-n-butyl)-5,5-dimethylhydantoin manufactured according to Example B (1.952 mols), 3060 ml. of epichlorohydrin (39.04 mols) and 9.7 g. of tetraethylammonium chloride is stirred for 1 hour at 90° C. Dehydrohalogenation is then carried out with 406 g. of 50% aqueous sodium hydroxide solution (5.15 mols), as described in Example B, with water being separated off continuously. The mixture is worked-up in accordance with Example B and 752.4 g. (100% of theory) of a mobile, clear, transparent, light brown epoxide resin having an epoxide content of 4.96 equivalents/kg. (95.4% of theory) is obtained. The total chlorine content is 1.9%.

The infra-red spectrum shows, through the disappearance of the OH frequency at 3500 cm.¹ and the appearance of an intensive C-O-C absorption, that the desired substance, corresponding essentially to the following structure, has been produced:

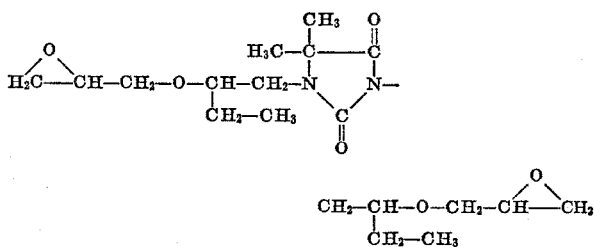

Example 3

1-Glycidyl-3-(2' - glycidyloxycyclohexyl)-5,5-dimethylhydantoin: 113.2 g. of the 3-(2'-hydroxycyclohexyl)-5,5-dimethylhydantoin manufactured according to Example C (0.5 mol) are treated with 925 g. of epichlorohydrin (10 mols) and 2.5 g. of tetraethylammonium chloride for 2 hours at 90° C., in accordance with Example 1. The dehydrohalogenation with 104 g. of 50% aqueous sodium hydroxide solution, and the working-up of the batch, take place according to Example 1.

169 g. (100% of theory) of a light brown, viscous epoxide resin with 5.05 epoxide equivalents/kg. (85.4% of theory) are obtained. The total chlorine content is 1.5%. The infra-red spectrum shows, inter alia, through the presence of the absorptions of the epoxide ring and of the hydantoin ring, in addition to the absorptions of the C-O-C grouping at approx. 1110 cm.⁻¹, that the new epoxide resin has the formula given below

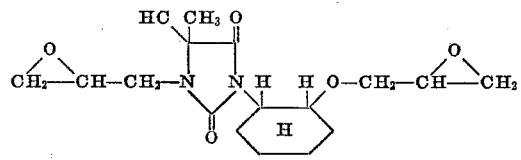

Example 4

A mixture of 525 g. of the 1,3-di-(2'-hydroxy-n-butyl)-5,5 - dimethyl-6-isopropyl-5,6-dihydrouracil manufactured according to Example D (1.6 mols), 4486.3 g. of epichlorohydrin (48 mols) and 10.46 g. of 50% aqueous tetraethylammonium chloride solution is stirred for 30 minutes at 115–117° C.

The reaction with 320 g. of 50% sodium hydroxide solution (4.0 mols) is then carried out exactly as has been described in Example 1. Working-up also takes place in accordance with Example 1.

705 g. (corresponding to 100% of theory) of a light brown, clear resin of low viscosity are obtained in this way, having an epoxide content of 3.40 epoxide equivalents/kg.

II. USE EXAMPLES

Example I 98.0 g. of the 1-glycidyl-3-(2'-glycidyloxy-n-butyl)-5,5-dimethylhydantoin manufactured according to Example 1, having 6.40 epoxide equivalents/kg., are stirred with 82.5 g. of hexahydrophthalic anhydride and 2 g. of benzyldimethylamine at 60° C. to give a homogeneous, clear, transparent solution. This solution is cast into aluminium moulds prewarmed to 80° C. and cured over the course of 2 hours/80° C. and 3 hours/120° C. and 10 hours/150° C. The gelling time of the resin-curing agent mixture without addition of benzyldimethylamine is 282 minutes at 80° C. (50 g. sample, Tecam gelation timer).

The clear, transparent mouldings thus obtained show the following properties:

Flexural strength (VSM 77,103) --- 14.03 kp./mm.²
Impact strength (VSM 77,105) ---- 17.63 cm.kp./cm.²
Deflection (VSM 77,103) --------- 10.2 mm.
Heat distortion point according
  to Martens (DIN 53,458) ------- 89° C.
Cold water absorption (4 days/
  20° C.) ----------------------- 0.43 percent
Tensile strength (VSM 77,101) ---- 2.0 percent
Elongation at break (VSM 77,101) - 5.24 kp./mm.²

Example II

A homogeneous mixture of 85.7 g. of 1-glycidyl-3-(2'-glycidyloxy-n-butyl)-5,5-dimethylhydantoin manufactured according to Example 1, having 6.40 equivalents per kg., and 14.4 g. of triethylenetetramine is cast at room temperature into an aluminium mould of 4 mm. wall thickness (layer thickness 4 mm.). Curing takes place in 24 hours/40° C. and 6 hours/100° C. The clear, transparent, pale yellow sheet thus obtained shows the following mechanical properties:

Flexural strength (VSM 77,103) ----- 11.4 kp./mm.²
Deflection (VSM 77,103) ----------- 12.4 mm.
Impact strength (VSM 77,105) ------ 18.5 cm.kp./cm.²

Example III 202 g. of the 1,3 - di - (2'-glycidyloxy-n-butyl)-5,5-dimethylhydantoin manufactured according to Example 2, having 4.96 epoxide equivalents/kg., are mixed with 131.5 g. of hexahydrophthalic anhydride at 50° C. and this mixture is cast into aluminium moulds prewarmed to 80° C. Curing is carried out in 2 hours/80° C. and 3 hours/120° C. and 13 hours/150° C. The gelling time (Tecam gelation timer) of a 50 g. sample is 65 minutes at 80° C. The mouldings thus obtained show the following properties:

| | |
|---|---|
| Flexural strength (VSM 77,103) | 10.2 kp./mm.² |
| Impact strength (VSM 77,105) | 8.9 cm.kp./cm.² |
| Cold water absorption (4 days, 20° C.) | 0.53 percent |
| Tensile strength (VSM 77,101) | 6.52 kg./mm.² |
| Elongation at break (VSM 77,101) | 3.0 percent |
| Tracking resistance (VDE 0303) | level KA 3c |
| Breakdown voltage, instantaneous, 24° C. | 205 kv./cm. |
| Dielectric loss factor (50 c./s.) tg. δ: | |
| At 28° C. | 0.006 |
| At 40° C. | 0.008 |
| Volume resistance 28° C. | 2.8×10¹⁶Ω·cm. |

Arcing resistance (ASTM 495) no tracking trace up to 60 seconds.

Example IV

A mixture of 60 g. of the 1-glycidyl-3-(2'-glycidyl-oxy-cyclohexyl)-5,5-dimethylhydantoin manufactured according to Example 3, having a 5.05 epoxide equivalents/kg., and 39.8 g. of hexahydrophthalic anhydride is converted to a clear, homogeneous melt at 70° C. This melt is briefly degassed and is then cast into aluminum moulds pre-warmed to 80° C. Curing takes place in 2 hours at 80° C., 2 hours at 120° C. and 12 hours at 150° C. The glass-clear, pale yellow-coloured mouldings thus obtained show the following properties:

Flexural strength (VSM 77,103)=9.5 kp./mm.²
Deflection (VSM 77,103)=3.3 mm.
Impact strength (VSM 77,105)=cm.kp./cm.²
Heat distortion point according to Martens (DIN)= 90° C.

Example V 20 g. of an adduct of 73.6 parts of triethylene-tetramine+26.4 parts of propylene oxide are mixed into 100 g. of 1,3-di-(2'-glycidyloxy-n-butyl)-5,5-dimethyl-hydantoin manufactured according to Example 2. This mixture and 12 layers of glass fabric are worked by the hand laminating process into a sheet of 3 mm. thickness. The sheet is pressed for 24 hours in a press at room temperature and under contact pressure. Further curing in an oven is carried out for 24 hours at 60° C. A product having a sheet thickness of 2.9 mm., which is tough and flexible, transparent and free from air, and has a glass content of 65%, is obtained.

What is claimed is:

1. A diglycidyl ether of the formula $$CH_2\text{—}\overset{O}{\underset{}{\diagdown}}\text{C}\text{—}CH_2\text{—}\left(O\text{—}\underset{Y_3}{\overset{}{CH}}\text{—}\underset{Y_1}{\overset{}{CH}}\right)_m\text{—}\overset{}{\underset{X_1}{N}}\overset{\overset{Z}{\frown}}{\underset{\underset{O}{\parallel}}{C}}\overset{C=O}{\underset{}{}}N\text{—}$$

$$\left(\underset{Y_2}{\overset{}{CH}}\text{—}\underset{Y_4}{\overset{}{CH}}\text{—}O\right)_n\text{—}CH_2\text{—}\overset{}{\underset{X_2}{C}}\overset{O}{\underset{}{\diagdown}}CH_2$$

wherein $X_1$, $X_2$, $Y_1$ and $Y_2$ each represents a member selected from the group consisting of a hydrogen and a methyl and $Y_3$ and $Y_4$ each represents a member selected from the group consisting of methyl and ethyl, the sum of the carbon atoms in the two radicals $Y_1$ and $Y_3$ or $Y_2$ and $Y_4$ having always to be 2, or wherein $Y_2$ and $Y_4$ together can also form a member selected from the group consisting of divalent trimethylene and tetramethylene and Z represents a member selected from the group consisting of the formulae $$\diagdown C=O; \quad \diagdown C\diagdown \overset{R'}{\underset{R''}{}}; \quad \diagdown \overset{C=O}{\underset{C-R'}{|}}; \quad \diagdown \overset{C-R'}{\underset{C-R''}{\parallel}} \text{ and } \quad \diagdown \overset{R'}{\underset{R''''}{\overset{|}{\underset{|}{C-R''}}}} \overset{}{\underset{}{C-R'''}}$$

wherein R', R'', R''' and R'''' each represents a member selected from the group consisting of alkyl with 1 to 5 carbon atoms, alkenyl with 2 to 5 carbon atoms, cyclohexyl, cyclohexenyl, phenyl, or when Z represents the formula $$\diagdown C \diagdown \overset{R'}{\underset{R''}{}},$$

R' and R'' together can also form a member selected from the group consisting of divalent tetramethylene and pentanethylene and m and n each represents an integer having a value of 0 to 4, with the sum of m and n having to be at least 1.

2. A compound as claimed in claim 1 which is 1-glycidyl-3-(2'-glycidyloxy-n-butyl)-5,5-dimethyl-hydantoin.

3. A compound as claimed in claim 1 which is 1,3-di-(2'-glycidyloxy-n-butyl)-5,5-dimethyl-hydantoin.

4. A compound as claimed in claim 1 which is 1-glycidyl-3-(2'-glycidyloxycyclohexyl)-5,5-dimethyl-hydantoin.

5. A compound as claimed in claim 1 which is 1,3-di-(2'-glycidyloxy-n-butyl) - 5,5 - dimethyl-6-isopropyl-5,6-dihydrouracil.

References Cited
UNITED STATES PATENTS 3,629,263    12/1971    Batzer et al.    260—260
3,449,353     6/1969    Povet et al.    206—309.5

DONALD G. DAUS, Primary Examiner
A. M. T. TIGHE, Assistant Examiner

U.S. Cl. X.R.

117—161 ZB; 161—184; 260—2 EP, 2 EA, 2 N, 2 A, 257, 309.5